United States Patent [19]
Giannuzzi et al.

[11] Patent Number: 5,787,672
[45] Date of Patent: *Aug. 4, 1998

[54] CENTERING SLEEVE AND OVERFLOW ASSEMBLY

[76] Inventors: Louis N. Giannuzzi; Anthony C. Giannuzzi, both of 28 Doral Farm Rd., Stamford, Conn. 06902

[*] Notice: The term of this patent shall not extend beyond the expiration date of Pat. No. 5,628,161.

[21] Appl. No.: 798,155

[22] Filed: Feb. 10, 1997

Related U.S. Application Data

[60] Division of Ser. No. 526,203, Sep. 11, 1995, Pat. No. 5,628,161, which is a continuation-in-part of Ser. No. 431,507, Apr. 28, 1995, Pat. No. 5,562,377.

[51] Int. Cl.$^6$ .................................................. F16B 13/00
[52] U.S. Cl. ............................. 52/698; 52/699; 52/704; 405/259.5; 405/259.6
[58] Field of Search ............... 52/27, 127.3, 127.4, 52/220.8, 295, 298, 698, 699, 704, 705; 384/275, 296; 405/259.5, 259.6

[56] References Cited

U.S. PATENT DOCUMENTS

| | | | |
|---|---|---|---|
| 3,417,525 | 12/1968 | Dashio | 52/704 X |
| 4,624,585 | 11/1986 | Nix et al. | 384/296 |
| 5,098,227 | 3/1992 | Wright | 405/259.6 |
| 5,144,777 | 9/1992 | Fishel et al. | 52/220.8 X |
| 5,435,679 | 7/1995 | Barry | 411/339 |
| 5,560,163 | 10/1996 | Carlton | 52/220.8 X |
| 5,562,377 | 10/1996 | Giannuzzi et al. | 411/82 |
| 5,628,161 | 5/1997 | Giannuzzi et al | 52/698 |
| 5,634,311 | 6/1997 | Carlton | 52/220.8 X |

FOREIGN PATENT DOCUMENTS 0221018  12/1983  Japan .................................... 384/275

*Primary Examiner*—Robert Canfield
*Attorney, Agent, or Firm*—Michael Ebert

[57] ABSTRACT

A centering sleeve and overflow ring assembly adapted to facilitate proper installation in a hole drilled in masonry of a stud for fastening a fixture or other object to the masonry. Deposited in the hole is a charge of a flowable bonding agent which when cured then anchors in place the stud inserted in the hole. The ring is preferably formed of a flat, tearable material and is seated on the masonry in registration with the hole. The sleeve which is snugly nested in the upper end of the hole includes inwardly-directed centering means that engage the stud inserted in the hole to maintain the stud centered therein while providing a flow passage between the stud and the sleeve. When the inserted stud plunges into the charge of bonding agent, the agent then rises in the hole and passes through the flow passage in the sleeve to overflow onto the ring. After the overflow accumulated on the ring cures and hardens, it can then be discarded by tearing off the ring. The centering means may be arranged to retard gravity flow of the agent from the sleeve should the sleeve be nested in a hole drilled in overhead or vertical masonry, thereby preventing leakage of the agent from the hole.

7 Claims, 2 Drawing Sheets

CENTERING SLEEVE AND OVERFLOW ASSEMBLY

RELATED APPLICATIONS

This application is a division of the Giannuzzi et al. application Ser. No. 08/526,203, filed Sep. 11, 1995 now U.S. Pat. No. 5,628,161, entitled CENTERING SLEEVE AND OVERFLOW RING ASSEMBLY, which in turn is a C-I-P of the Giannuzzi et al. application Ser. No. 08/431,507, filed Apr. 28, 1995 entitled ANCHOR SLEEVE AND BOLT ASSEMBLY (now U.S. Pat. No. 5,562,377). The entire disclosures of the above-identified applications are incorporated herein by reference.

BACKGROUND OF INVENTION

1. Field of Invention

This invention relates generally to chemically-bonded anchor studs for fastening fixtures and other objects to masonry, and more particularly to a centering sleeve and overflow ring assembly to facilitate the installation of the anchor stud in a hole drilled in masonry having deposited therein a flowable bonding agent which when cured anchors the stud in place.

2. Status of Prior Art

The term masonry refers to a construction of stone or similar materials such as concrete and brick. The walls, ceiling and floors of many edifices are formed of masonry. In order, therefore, to fasten fixtures, machines, structural members or other objects to masonry, a masonry anchor is required for this purpose.

In the case of concrete or any other form of masonry, one cannot drill a hole therein and then tap this hole so that it can receive an anchor bolt, a threaded stud or other threaded mounting means to secure a fixture or other object to the face of the masonry. The nature of masonry is such that a tapping action to cut female threading into the bank of the hole cannot be effected, for this action will disintegrate the masonry material.

In order, therefore, to anchor a threaded rod or stud is a hole drilled in masonry, the present practice is to use a curable chemical bonding agent for this purpose. The typical agent of this type has two flowable components, one being a resinous bonding agent and the other, a hardener therefor. The resins may be phenol, vinyl, ester or epoxy based. The two components, when stored, must be separated to prevent interaction therebetween. Many bonding agents currently available have an accelerated curing time and set within 10 to 30 minutes to afford substantial holding power. In practice, a charge of the resinous component and sufficient hardener intermixed therewith is deposited in the hole, and a threaded mounting stud is then inserted in the hole.

To this end use may be made of a dispenser gun to inject a charge of the flowable bonding agent into the drilled hole. Or the charge may be contained in a capsule that is deposited in the drilled hole and is ruptured to release the bonding agent when the stud is inserted in the hole.

After the resinous interfacial layer between the stud and the bank of the hole cures and rigidifies, it then bonds itself both to the stud and to the masonry, so that the stud is permanently anchored in the hole. In order now to secure a fixture to the masonry face, the fixture which has a mounting hole therein is placed over and onto the projecting stud and locked thereto by a washer and nut.

Of prior art background interest is the Kellison U.S. Pat. No. 4,642,964 which discloses a fastening system for chemically-bonding an anchor bolt in a hole drilled in masonry.

One problem faced by the installer of an anchor stud or bolt into a hole drilled in masonry arises from the fact that when the hole has deposited therein a charge of an uncured bonding agent in which is inserted the anchor to be installed, the installer cannot then see into the hole. In order, therefore, to be sure that the charge of bonding agent he has deposited is adequate for its intended purpose, the installer depends on an overflow of the agent from the hole all around the anchor stud. This overflow indicates to the installer that the uncured bonding agent in the hole is properly spread about in the hole is properly spread about the inserted anchor. However, while this overflow of uncured bonding agent is necessary to a proper anchor installation procedure, it also creates a multitude of problems, as will now be explained.

One ancillary problem encountered by an installer arises from the overflow of the uncured bonding agent onto the region of the masonry surrounding the projecting stud. While such overflow is useful, for it serves to indicate that the space surrounding the stud in the hole is filled with the uncured agent, this overflow onto the masonry surface cannot be permitted to cure and harden. Should this happen, a protuberance would be created on the masonry that would interfere with the proper placement of the fixture or other object onto the masonry.

Moreover, no matter how carefully the installer wipes off the uncured overflow, there is usually a residue left on the masonry surface. And when a fixture is then placed on this surface so that it can be fastened to the masonry, the residue at the interface of the fixture (or other object) will then bond the fixture to the masonry. This is highly undesirable, for should it be necessary to later remove the fixture from the masonry, it may then be very difficult to do so.

The stud inserted in the drilled hole has a diameter which is necessarily smaller than that of the drilled hole in order to create a space between the stud and the wall of the hole to accommodate the bonding agent. This gives rise to another serious problem, for the inserted stud is not held upright by the flowable uncured agent and tends to lean against the hole. As a consequence, the anchored stud projecting from the masonry will not be perpendicular to the surface of the masonry, and will not be properly aligned with the mounting hole in the fixture to be fastened to the masonry.

Since the diameter of the fixture mounting hole substantially matches that of the stud, a tilted stud may make it impossible to fasten the fixture to the masonry. In a typical installation, the fixture has at least four mounting holes, and these dictate a like number of anchor studs. Should any of these studs be inclined to a degree where it will not pass through the corresponding mounting hole in the fixture, one cannot then complete the installation.

When the stud is to be anchored in overhead masonry, so that the hole drilled therein has a vertical axis, or is to be anchored in vertical masonry so that the hole drilled therein has a horizontal axis, then still another problem is encountered. Now one is faced with leakage of the flowable bonding agent deposited in the hole as a result of gravity flow from the open end of the drilled hole.

Though the uncured agent is usually quite viscous and slow to leak out of the hole, a gradual leakage as a result of gravity flow will diminish the amount of agent in the annular space between the stud and the bank of the hole and may result in inadequate anchoring of the stud in the drilled hole. This may have serious consequences, especially in an overhead masonry installation to which a heavy object is fastened.

As evidenced by the Sawaide U.S. Pat. No. 5,049,015, it is known to fit a sleeve into the upper end of a hold bored in masonry in order to center the stud inserted through the sleeve into the hole which contains a charge of an uncured chemical bonding agent. The sleeve functions to maintain the stud upright while the agent undergoes curing. However, because the inner wall of the sleeve is in direct contact with the inserted stud, this blocks any overflow of the bonding agent out of the hole. As previously noted, such overflow is a useful indicator that the amount of agent in the hole is adequate to anchor the stud therein.

Also disclosing a centering sleeve fitted into the upper end of a masonry hole is the Fischer U.S. Pat. No. 4,211,049. The Fischer sleeve effectively closes the hole so that there is no outflow of binding material from the hole even when the hole is drilled in a ceiling or vertical wall.

An installation made in a hole drilled in overhead or vertical masonry presents a special problem for in both cases there is a possible loss of the bonding agent deposited in the hole as a result of gravity flow. When the stud is inserted in the drilled hole and plunged into the deposit of the flowable bonding agent, an overflow out of the hole is then desirable, for this is indicative of an adequate deposit to anchor the stud. To this end there must be a flow passage between the stud and the wall of the centering sleeve fitted into the hole.

However, after overflow takes place, the same flow passage will permit a viscous bonding agent to gradually leak out of the hole by reason of gravity flow and thereby diminish the amount of agent available to chemically anchor the stud in the hole.

Also of prior art interest is the Lang U.S. Pat. No. 4,263,132 which discloses a centering stud loosely received in a masonry hole and provided with an end flange that nests on the masonry.

The term stud, as used herein is used in a generic sense, and is applicable to any partially or fully threaded rod, bolt post or other rod-like member adapted to be anchored in masonry and to project therefrom.

SUMMARY OF INVENTION

In view of the foregoing, the main object of this invention is to provide a centering sleeve and overflow ring assembly adapted to facilitate the proper installation in a hole drilled in masonry of a stud for fastening a fixture or other object to the masonry, the hole having deposited therein a flowable bonding agent that when cured, then chemically anchors the stud in place.

More particularly, an object of this invention is to provide an assembly of the above type in which the sleeve includes inwardly-directed centering means to maintain the stud centered within the sleeve and coaxial therewith whereby the uncured agent is flowable through the annular flow passage between the stud and the sleeve.

Also an object of this invention is to provide an assembly that includes a tearable overflow ring on which is collected an overflow of the bonding agent from the drilled hole, which overflow, after it is cured and hardened, can then be discarded by tearing off the ring, thereby leaving a clean masonry surface surrounding the stud.

Yet another object of the invention is to provide an assembly whose sleeve includes centering means which retard gravity flow and leakage of the uncured bonding agent from a hole drilled in an overhead or vertical masonry body.

Briefly stated, these objects are attainable by a centering sleeve and overflow ring assembly adapted to facilitate proper installation in a hole drilled in masonry of a stud for fastening a fixture or other object to the masonry. Deposited in the hole is a charge of a flowable bonding agent which when cured then anchors in place the stud inserted in the hole. The ring is formed of a flat, tearable material and is seated on the masonry in registration with the hole. The sleeve which is preferably snugly nested in the upper end of the hole includes inwardly-directed centering means that engage the stud inserted in the hole to maintain the stud centered therein while providing a flow passage between the stud and the sleeve.

When the inserted stud plunges into the charge of bonding agent, the agent then rises in the hole and passes through the flow passage in the sleeve to overflow onto the ring. After the overflow accumulated on the ring cures and hardens, it is then discarded by tearing off the ring. The centering means are arranged to retard gravity flow of the agent from the sleeve should the sleeve be nested in a hole drilled in overhead or vertical masonry, thereby preventing leakage of the agent from the hole.

BRIEF DESCRIPTION OF DRAWING

For a better understanding of the invention, as well as other objects and further features thereof, reference is made to the following detailed description to be read in conjunction with the accompanying drawing, wherein.

DETAILED DESCRIPTION OF INVENTION

Figure 1:
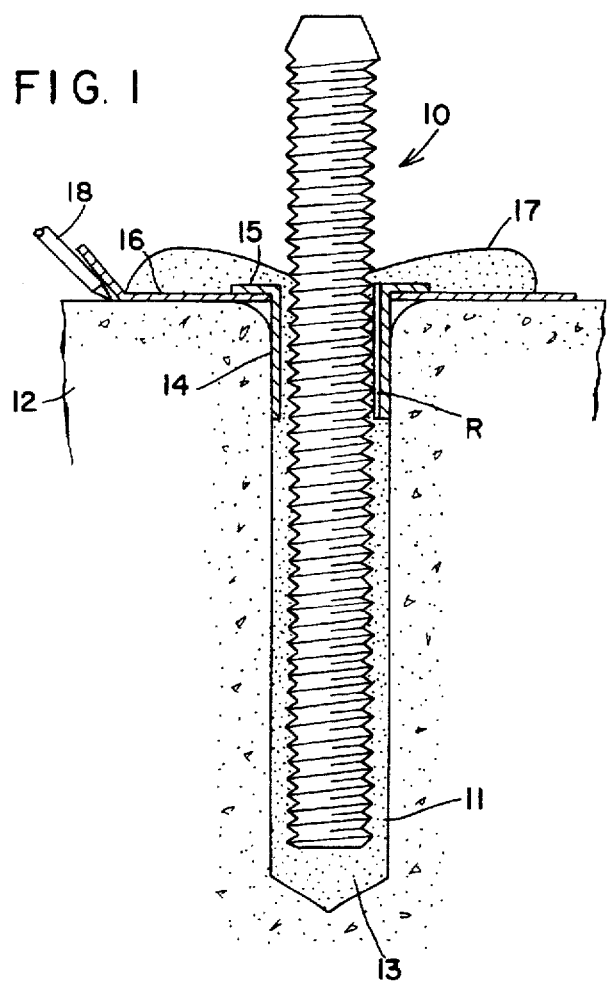
FIG. 1 is a sectional view of a centering sleeve and overflow member assembly in accordance with the invention associated with a stud installed in a hole drilled in masonry.
Figure 2:
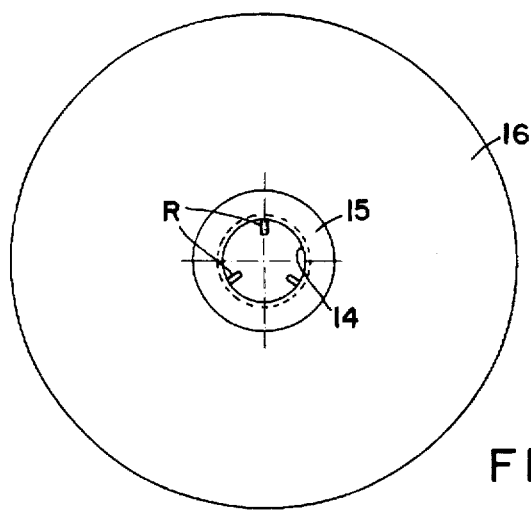
FIG. 2 is a plan view of the assembly.
Figure 3:
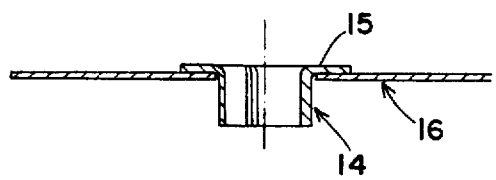
FIG. 3 is a sectional view of the assembly.

Referring now to FIGS. 1, 2 and 3, there is shown a centering sleeve and overflow assembly in accordance with the invention associated with an externally-threaded anchor rod or stud 10 to be installed in a hole 11 drilled in concrete 12 or other type of masonry. The anchor stud which is chemically bonded to the bank of the drilled hole, projects above the surface of the masonry and is perpendicular thereto. The stud serves to fasten to the masonry a fixture or other object having a mounting hole through which the stud projects, a nut or other means being received on the stud to secure the fixture to the masonry.

The diameter of drilled hole 11 is greater than that of stud 10 to provide an annular space between the stud and the wall of the hole to accommodate an uncured and flowable chemical bonding agent 13 which in practice may be an epoxy resin. This resin is flowable in its uncured state and hardens when cured. The amount of flowable bonding agent deposited in drilled hole 11 is such as to initially occupy only the lower region of the hole. And the amount is such that when the stud is inserted in the hole and is plunged into the bonding agent, the flowable agent then rises in the hole into the annular space between the stud and the wall of the hole. There is sufficient bonding agent deposited as to cause a limited overflow thereof out of the hole to indicate that the annular space between the stud and the bank of the hole is fully occupied. Hence an excess deposit serves to indicate to the installer that the stud is properly anchored.

The assembly includes a cylindrical sleeve 14 whose outer diameter substantially matches that of the drilled hole and whose inner diameter is greater than that of stud 10. When the sleeve is pressed or tapped into the drilled hole, it is then snugly nested in the upper end thereof and cannot be displaced by the rising bonding agent. The upper end of sleeve 14 has an annular flange 15 extending laterally therefrom whose diameter is greater than that of the drilled hole. Sleeve 14 and its flange 15 are molded of relatively stiff synthetic plastic material, such as polypropylene and or polyethylene.

Figure 4:
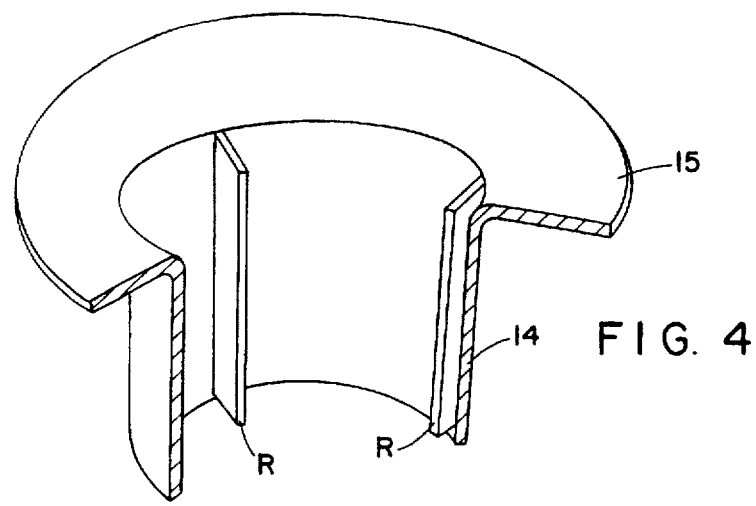
FIG. 4 is a perspective view of the sleeve included in the assembly which is cut away to expose the centering ribs.

As best seen in FIG. 4, sleeve 14 is provided with centering means in the form of an array of longitudinally extending ribs R which project inwardly to engage stud 10 inserted in the sleeve and thereby maintain the stud in coaxial alignment with the sleeve and centering the stud to prevent it from leaning against the sleeve. The annulus space between the stud and the inner wall of the same acts as a flow passage. As previously pointed out, it is important that the stud projects from the masonry and be perpendicular thereto so that it does not tilt. When a fixture is placed on the masonry, the stud then projects through its mounting hole.

The assembly also includes a ring 16, preferably die-cut of flat sheet material such as paper or a paper-like, non-woven fabric. The ring material is tearable, and after the ring has accumulated an overflow of the bonding agent and the agent has hardened, the ring may be torn or broken off the installed stud and discarded, leaving a clean masonry surface. Or the ring may be formed of thin plastic material that is easily cracked. The diameter of the ring is such as to provide an adequate surface for the anticipated excess agent to be accumulated thereon, for it is important that no excess make contact with the masonry surface.

Ring 16 whose diameter is large relative to that of flange 15 of the sleeve, is seated on the masonry, as shown in FIG. 1, in registration with hole 11 drilled therein. In practice, a hole is first drilled in the masonry at a desired site with an ANSI drill to a depth appropriate to the length of the stud, but with a greater diameter. After the hole is blown clean, ring 16 is seated on the masonry and centering sleeve 14 is then pressed into the hole with its flange 15 overlying the ring so that the sleeve is snugly nested. Sleeve 14 lines the upper end of the hole so that no bonding agent can flow between the bank of the hole and the sleeve, but only through the flow passage within the sleeve.

Then a charge of an uncured, flowable bonding agent 13 is deposited in the drilled hole, after which stud 10 is inserted in the hole through the centering sleeve. The inserted stud causes the bonding agent in which it is plunged to rise in the hole through the annular space between the stud and the bank of the hole. The rising bonding agent overflows out of the flow passage in the sleeve onto the surface of ring 16 where the overflow is collected.

The amount of the deposit must be such in relationship to the size of the hole and that of the stud inserted therein whereby the resulting overflow will all be collected on the ring and not spread beyond the ring onto the masonry surface. The amount of the deposit is predetermined and depends, of course, on the dimensions of the stud to be installed.

After the collected overflow cures and hardens, it forms a rigid blob 17 on the ring. The presence of the blob is not acceptable, for it would interfere with a proper fixture mounting on the masonry. The blob is therefore removed by means of a screwdriver 17 whose blade is pushed under ring 16 to tear or break it off so that the blob adhered thereto can be discarded, leaving a clean masonry surface.

The centering means on the sleeve must be such as to support the inserted stud coaxially in the sleeve without however blocking the outflow of excess bonding agent from the sleeve. Instead of centering ribs, the sleeve may be provided with a relatively thick wall whose inner surface is provided with an array of longitudinally extending flutes to define flow passages for the outflow of the bonding agent.

Modifications:

In some situations it is desirable that the centering sleeve not permit a flowable bonding agent to flow freely therethrough. Thus when a threaded stud is installed in a drilled hole in overhead masonry, the charge of flowable bonding agent deposited in the drilled hole, even when it is a viscous epoxy resin, because of gravity flow will gradually leak out of this vertical hole. Hence a sleeve having longitudinally-extending centering ribs, as in FIG. 4, will not even partially arrest such leakage. Leakage is not acceptable, for it will diminish the amount of agent in the annular space between the stud and the bank of the hole and result in inadequate anchoring of the stud.

A similar situation would arise when a threaded stud is to be installed in a vertical masonry wall, and the hole drilled in this wall then has a horizontal axis, as a result of which the bonding agent deposited in the hole seeks to leak out of the hole by reason of gravity flow.

Figure 5:
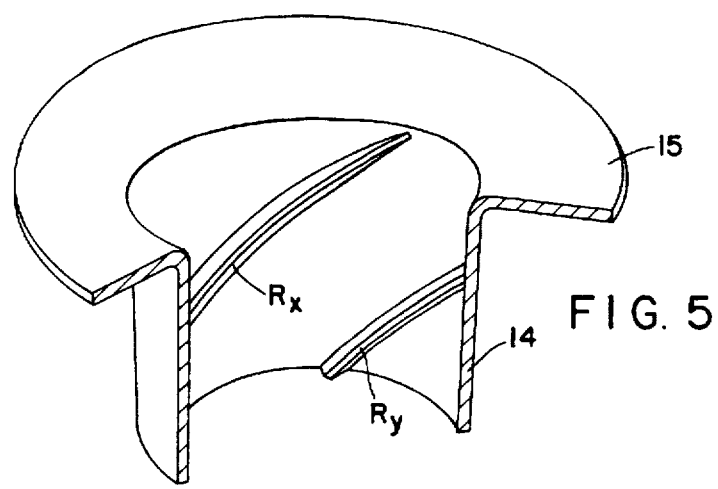
FIG. 5 is a perspective view of another embodiment of the sleeve.

In order to impede gravity flow from the drilled hole, the sleeve 14 shown in FIG. 5 is provided with centering ribs $R_x$ and $R_y$ which are segments of a helix and serve therefore to intercept a flowable agent when as a result of gravity flow the agent seeks to flow out of the drilled hole. Ribs $R_x$ and $R_y$ only retard or partially block outflow, and an excess bonding agent, as in FIG. 1, will be collected on the overflow ring.

Figure 6:
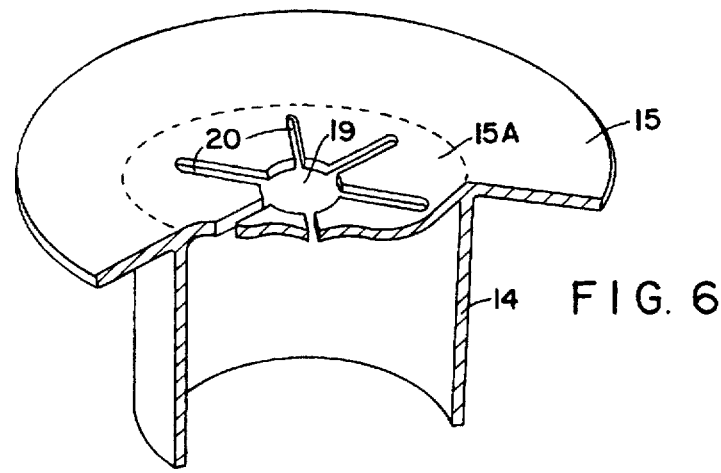
FIG. 6 is a perspective view of still another embodiment of the sleeve.

In the sleeve 14 shown in FIG. 6, coplanar with flange 15 extending outwardly from the upper end of the sleeve is a disc 15A of resilient material integral with the sleeve. Disc 15A is provided with a center bore 19 whose diameter is smaller than that of the stud to be inserted through the sleeve in the hole drilled in masonry, and an array of narrow slots 20 radiating from the bore to define five flexible flaps $F_1$ to $F_5$.

Center bore 19 of disc 15A serves as an inlet for the nozzle of a dispenser gun for injecting a charge of bonding agent into the drilled masonry hole to anchor a stud therein. When the stud is inserted into the relatively small diameter bore, flaps $F_1$ to $F_5$ are then deflected to permit entry of the stud into the hole. The flaps which engage the stud act to center the stud in the hole.

The narrow slots 20 in disc 15A provide restricted flow passages for the flowable bonding agent deposited in the drilled masonry hole. These passages permit outflow of the bonding agent onto the overflow ring 16, as is necessary to indicate proper anchoring of the stud. But these restricted flow passages function to retard outflow of the bonding agent as a result of gravity flow which takes place in overhead or vertical installations in masonry.

Thus a centering sleeve and ring assembly in accordance with the invention not only acts to center the anchor stud and make possible a proper installation, but it also acts to obviate the need to wipe off excess agent from the masonry, a messy and time consuming operation. And the assembly also makes it possible to effect a proper stud installation on overhead and vertical masonry without the loss of bonding agent as a result of gravity flow.

While there have been shown and described preferred embodiments of a centering sleeve and overflow ring assembly in accordance with the invention, it will be appreciated that many changes may be made thereon within the spirit of the invention. Thus instead of a circular paper ring to collect the excess bonding agent, one may use a square mat of paper or other tearable material for this purpose, the mat having a center opening aligned with the drilled hole.

The overflow ring need not be made of tearable or breakable material, but can be fabricated of an elastomeric material, such as latex whereby after the overflow bonding agent hardens thereon, stretching it and enlarging its opening so that the ring can be pulled off the projecting stud. Also instead of a flange at the upper end of the sleeve which overlies the overflow ring and acts to hold the ring in its proper position on the surface of the masonry other means may be provided for the same purpose and with an array of radical fingers or tube which engage the ring to hold it is place or the sleeve may be provided at its upper end with a lip which engages the ring.

We claim:

1. In combination with a stud and masonry having a hole drilled therein into which the stud is insertable, an open-ended, effectively cylindrical centering sleeve adapted to facilitate installation in said hole having a predetermined diameter drilled in said masonry of said stud having a diameter smaller than said predetermined diameter, said hole containing a charge of a flowable uncured bonding agent for anchoring the stud in the hole, said sleeve having an outer diameter substantially matching that of the hole so that it is adapted to be snugly received therein, said sleeve having a length such that the received sleeve acts to line only an upper end of the hole, said open-ended sleeve being provided with inwardly-directed centering means adapted to engage the stud inserted through the sleeve into the hole to maintain the stud in coaxial relation to the sleeve and to define a flow passage between the stud and the sleeve dimensioned to permit overflow of the uncured agent out of the hole when the stud is inserted therein and is plunged into said agent.

2. The combination as set forth in claim 1, wherein the sleeve is provided with an end flange which when the sleeve is snugly received in the hole then overlies the masonry.

3. The combination as set forth in claim 1, in which the centering means is formed by ribs integral with an inner wall of the sleeve.

4. The combination as set forth in claim 3, in which the ribs are in a circumferential array and extend along the length of the sleeve.

5. The combination as set forth in claim 3, in which the ribs are formed by segments of a helix.

6. The combination as set forth in claim 1, in which the centering means is formed by a disc of resilient material enclosing the upper end of the sleeve, said disc being provided with a center bore whose diameter is smaller than that of the stud.

7. The combination as set forth in claim 6, having an array of slots radiating from the bore in the disc to define flexible flaps which when the stud is inserted into the drilled masonry hole through the bore are then deflected and resiliently engage the stud to maintain it centered in the hole.

* * * * *